United States Patent [19]

Mizoguchi et al.

[11] Patent Number: 4,968,995

[45] Date of Patent: Nov. 6, 1990

[54] THERMAL PRINTER

[75] Inventors: Yutaka Mizoguchi, Yokohama; Itsuo Takanashi, Kamakura; Hideshi Tanaka, Yokohama; Terumi Ohara, Yokohama; Kenichi Miyazaki, Yokohama; Toshinori Takahashi, Kawasaki; Hiroki Kitamura, Tokyo; Tadao Shinya, Yokohama; Katsuhiko Terada, Yokosuka, all of Japan

[73] Assignee: Victor Company of Japan, Ltd., Japan

[21] Appl. No.: 375,439

[22] Filed: Jul. 5, 1989

[30] Foreign Application Priority Data

Jul. 5, 1988 [JP] Japan ............................ 63-89295[U]
Jul. 22, 1988 [JP] Japan ............................ 63-181682

[51] Int. Cl.⁵ ............................ G01D 15/10
[52] U.S. Cl. ............................ 346/76 PH
[58] Field of Search ............................ 346/76 PH

[56] References Cited

U.S. PATENT DOCUMENTS 4,475,114 10/1984 Koyama et al. ............... 346/76 PH
4,675,695 6/1987 Samuel ............................ 346/1.1

FOREIGN PATENT DOCUMENTS 60-90781 5/1985 Japan ............................ 400/120

*Primary Examiner*—Bruce A. Reynolds
*Assistant Examiner*—Gerald E. Preston
*Attorney, Agent, or Firm*—Lowe, Price, LeBlanc, Becker & Shur

[57] ABSTRACT

A thermal printer comprises a thermal head and a printing data output circuit outputting printing data. A portion of the printing data is copied. The copied portion of the printing data is added to a head of the printing data to form a combination of the copied portion and the printing data. The data combination is outputted to the thermal head. The thermal head is driven with the copied portion to preheat the thermal head. Then, the thermal head is driven with the printing data to perform actual printing.

6 Claims, 11 Drawing Sheets

THERMAL PRINTER

BACKGROUND OF THE INVENTION

1. Field of the Invention

This invention relates to a thermal printer.

2. Description of the Prior Art

Japanese published unexamined patent application No. 60-90781 discloses a color thermal printer in which different colors of information are sequentially recorded by a thermal head on a recording paper. The printing density or depth depends on the temperature of the thermal head and is subject to the color of ink. Accordingly, the thermal head is preheated by a heater to a temperature adequate to each color of ink. In this prior art printer, during the start of the activation of the thermal head to print each color of information, the temperature of the thermal head tends to deviate from a desired preheating range due to a self-heating effect. Such a temperature deviation causes an undesirable variation in the printing density.

SUMMARY OF THE INVENTION

It is an object of this invention to provide an improved thermal printer.

A thermal printer of this invention comprises a thermal head and a printing data output circuit outputting printing data. A portion of the printing data is copied. The copied portion of the printing data is added to a head of the printing data to form a combination of the copied portion and the printing data. The data combination is outputted to the thermal head. The thermal head is driven with the copied portion to preheat the thermal head. Then, the thermal head is driven with the printing data to perform actual printing.

DESCRIPTION OF THE FIRST PREFERRED EMBODIMENT

Figure 1:
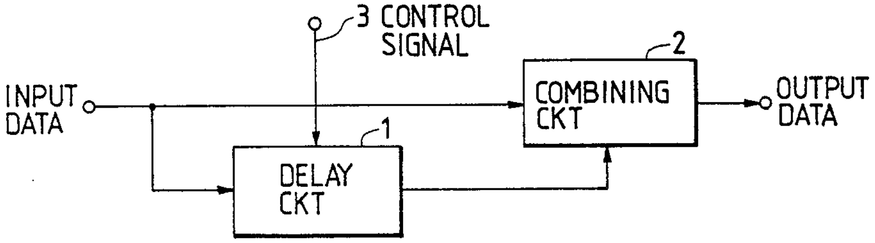
FIG. 1 is a diagram of a printing data output circuit in a thermal printer according to a first embodiment of this invention.

With reference to FIG. 1, a printing data output circuit includes a delay circuit 1 and a combining circuit 2. The printing data output circuit generates printing data on the basis of input data and feeds the printing data to a thermal head. The thermal head has a linear array of heating elements formed on a substrate. FIG. 1 does not show portions of the printing data output circuit which are similar to the corresponding portions of a known printing data output circuit.

Figure 4:
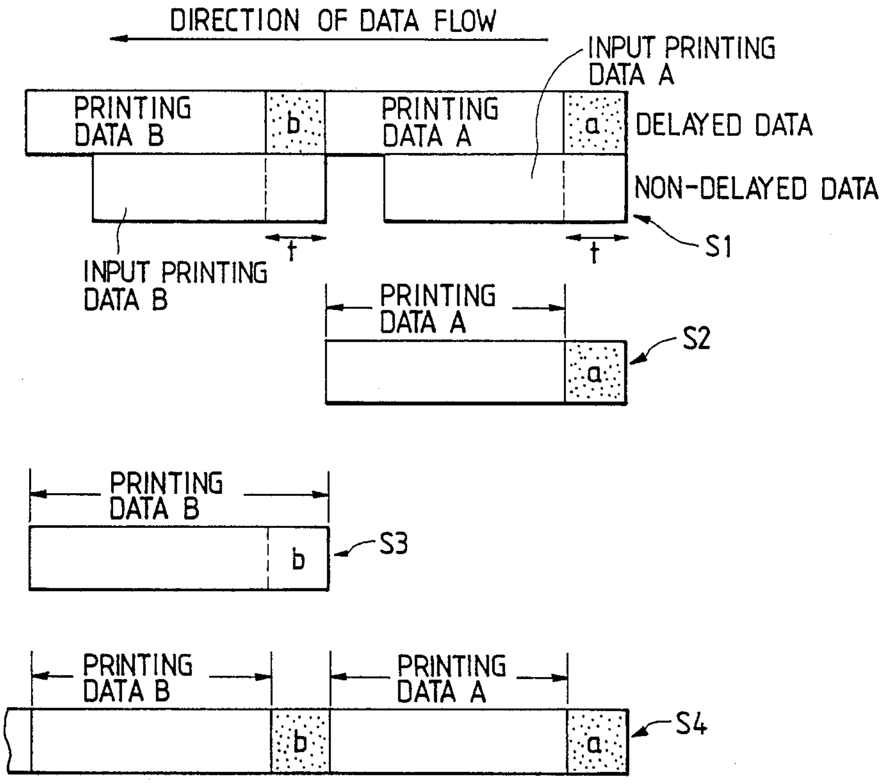
FIG. 4 is a diagram showing the sequence of combining the recording data in the first embodiment.

The operation of the printing data output circuit of FIG. 1 will be described in detail hereinafter with reference to FIG. 4. FIG. 4 shows an example of the sequence of generating the printing data. In FIG. 4, the characters "a" and "b" denote insertion data for blank printing which is performed to preheat the thermal head before the printing of information data A and B. As shown by the parts S1 and S3 of FIG. 4, the heads of the printing data A and B are used as the insertion data "a" and "b" respectively. In FIG. 4, the dotted areas denote the insertion data which is actually used in the blank printing.

In the printing data output circuit of FIG. 1, at an initial stage, the printing data A is inputted into the delay circuit 1 and the combining circuit 2 (see S1 of FIG. 4). The delay circuit 1 delays the printing data A by a predetermined time "t" and feeds the delayed data to the combining circuit 2. The combining circuit 2 selects one of the non-delayed printing data A and the delayed printing data A. Specifically, a head portion (head) of the non-delayed printing data A is selected as the insertion data "a", while the remainder of the non-delayed printing data A is rejected and instead the delayed printing data A is selected. As a result, the combining circuit 2 outputs a sequence of the insertion data "a" and the delayed printing data A (see S2 of FIG. 4). Then, after printing the delayed printing data A, the printing data B is inputted into the delay circuit 1 and the combining circuit 2 (see S3 of FIG. 4). The delay circuit 1 delays the printing data B by the predetermined time "t" and feeds the delayed data to the combining circuit 2. The combining circuit 2 selects one of the non-delayed printing data B and the delayed printing data B. Specifically, a head portion (head) of the non-delayed printing data B is selected as the insertion data "b", while the remainder of the non-delayed printing data B is rejected and instead the delayed printing data B is selected. As a result, the combining circuit 2 outputs a sequence of the insertion data "b" and the delayed printing data B (see S4 of FIG. 4). Similar processes are periodically reiterated. The delay circuit 1 is controlled by a control signal fed from a suitable device such as a CPU. For example, the delay circuit 1 includes a data storage circuit.

As understood from the previous description, a head portion of the printing data is copied. The copied head of the printing data is added to a starting end of the whole of the printing data used for actual printing.

Figure 2:
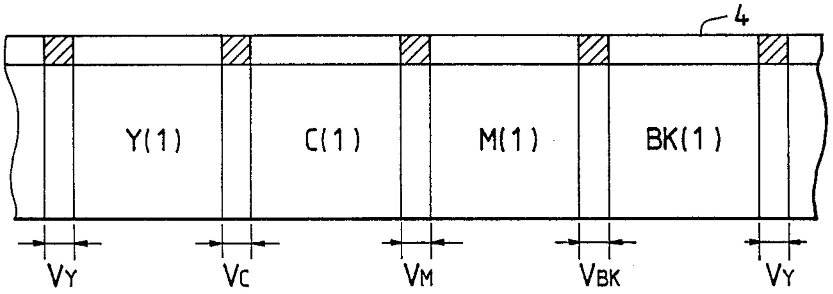
FIG. 2 is a plan view of an ink transfer film in the first embodiment.

FIG. 2 shows a portion of a color printing transfer film (ink film) 4. A transport mechanism (not shown)

moves the color printing transfer film 4 relative to the thermal head so as to be scanned by the head. In FIG. 2, the characters "Y", "C", "M", and "BK" denote yellow ink, cyan ink, magenta ink, and black ink respectively provided on the transfer film. In addition, the characters $V_Y$, $V_C$, $V_M$, and $V_{BK}$ denote inkless portions for blank printing. Hatched portions are black marks providing references for positioning. Four color ink layers are arranged in a predetermined order as "Y(1)-C(1)-M(1)-BK(1)-Y(2)-C(2)-M(2)-BK(2)- . . . ". Four information printings for the respective four colors complete the printing of a composite color image.

Figure 3A:
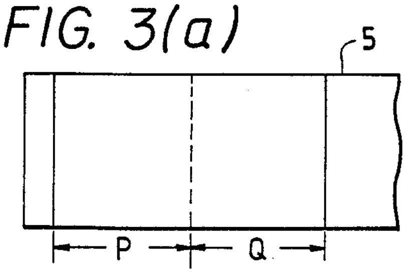
FIGS. 3(*a*), 3(*b*), 3(*c*), are a diagram composite showing the sequence of the divided recording in the first embodiment.
Figure 3B:
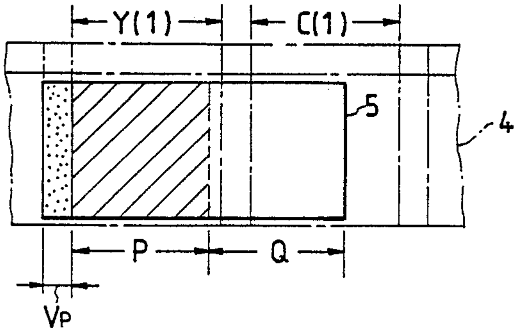
Figure 3C:
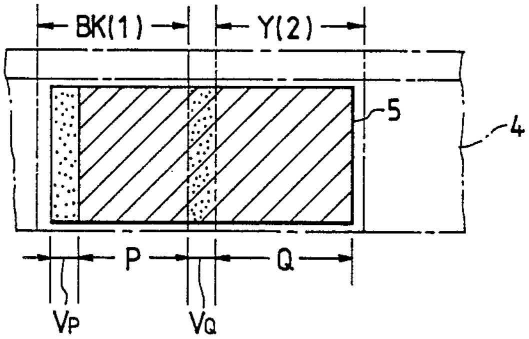

This embodiment will be further described in the case where a large image is divided into two parts P and Q during the printing thereof. FIG. 3(*a*) shows a printing paper 5 in a state before printing. The paper is moved together with the transfer film by the transport mechanism in the conventional manner. FIG. 3(*b*) shows conditions where the part P of the image is recorded. FIG. 3(*c*) shows conditions where the part Q of the image is printed. In FIG. 3(*c*), the characters $V_P$ and $V_Q$ denote blank printing ranges where insertion blank data is printed.

At first, the printing paper 5 and the transfer film 4 are matched in position such that the ink layer Y(1) of the transfer film 4 resides above the P part and the inkless portion $V_Y$ resides above the blank printing range $V_P$. Secondly, the blank printing is performed on the blank printing range $V_P$ (the dotted area) and then the part P of the image is printed. Similar processes are performed for each of the other ink layers C(1), M(1), and BK(1). In this way, the printing of the part P of the image is completed.

Subsequently, the printing paper 5 and the transfer film 4 are matched in position such that the ink layer Y(2) of the transfer film 4 resides above the Q part and the inkless portion $V_Y$ resides above the blank printing rage $V_Q$. Then, the blank printing is performed on the blank printing range $V_Q$ (the dotted area) and then the part Q of the image is printed. Similar processes are performed for each of the other ink layers C(2), M(2), and BK(2). In this way, the printing of the part Q of the image is completed.

Figure 5:
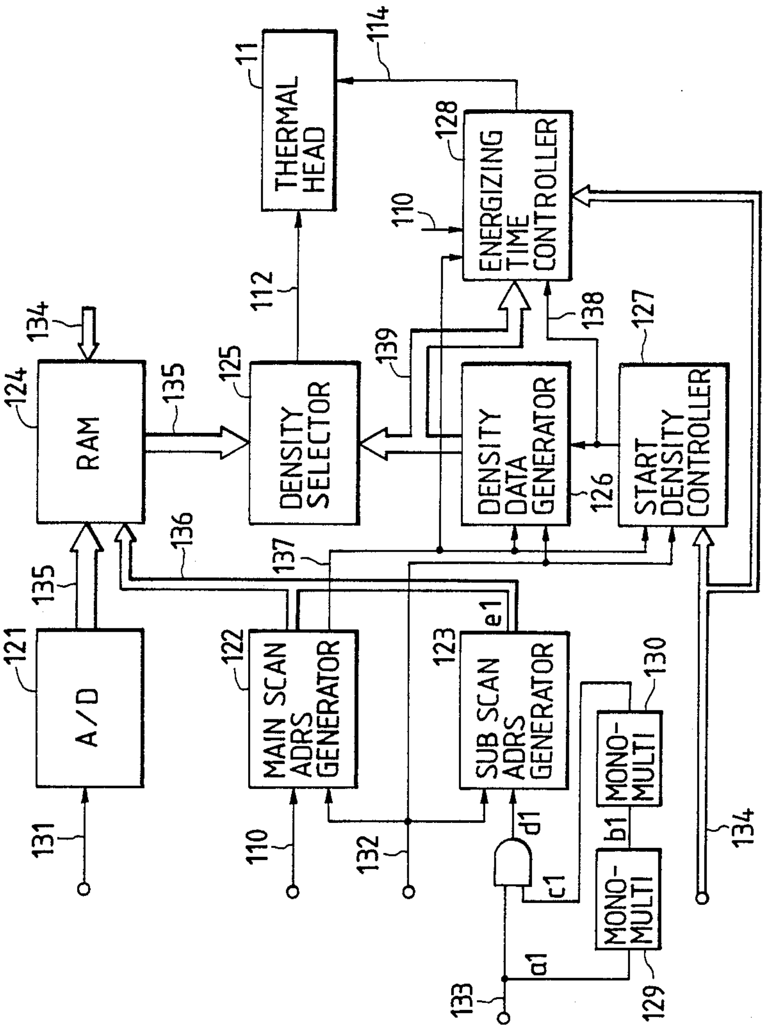
FIG. 5 is a block diagram of the control circuit in the first embodiment.

FIG. 5 shows a control circuit which feeds an on-selection signal 112 and a strobe signal 114 to a thermal head 11 to control the printing operation of the thermal head 11. The thermal head 11 has a linear array of heating elements formed on a substrate.

The control circuit of FIG. 5 includes an A/D converter 121, a main scan address generator 122, a sub scan address generator 123, a RAM 124, a density or halftone selector 125, a density or halftone data generator 126, a starting density controller 127, and an energizing time controller 128. The control circuit of FIG. 5 receives an analog image information signal 131, a reference clock signal 110, a line sync signal 132, a page sync signal 133, and a color selection signal 134.

The A/D converter 121 converts the analog image information signal into a corresponding 8-bit digital image information signal 135. The RAM stores the digital image information signal 135 having data whose quantity corresponds to one page. The main scan address generator 122 generates lower 8 bits of a 16-bit address signal 136 on the basis of the reference clock signal 110 and the line sync signal 132. The sub scan address generator 123 generates higher 8 bits of the 16-bit address signal 136 on the basis of the line sync signal 132 and the page sync signal 133. The address signal 136 is fed to the RAM 124. The storage locations of the RAM 124 into and from which the digital image information data are written and read out are designated by the address signal 136.

Figure 6:
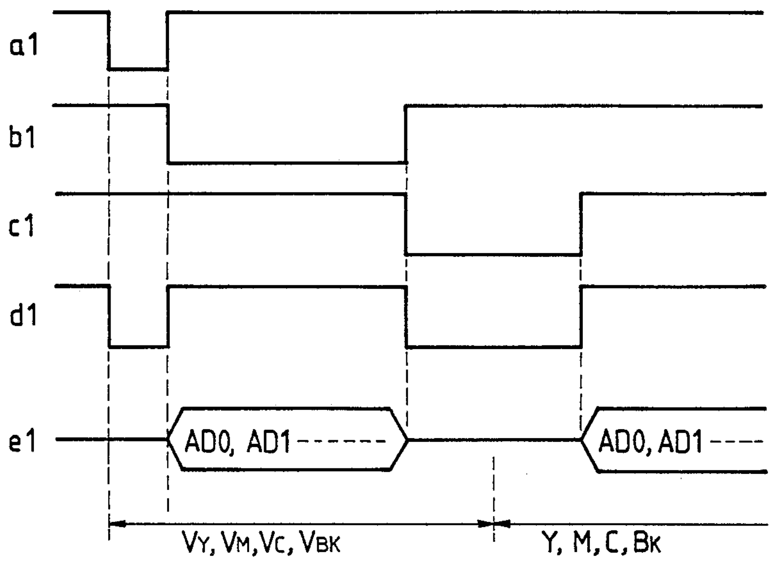
FIG. 6 is a timing diagram showing the various signals in the circuit of FIG. 5.

As shown in FIG. 5, the page sync signal 133 is applied to the sub scan address generator 123 as a signal "d1". As shown in FIG. 6, the higher 8 bits "e1" of the address signal 136 is reset at a negative-going edge of the signal "d1" and is started to increment at the moment of the occurrence of a positive-going edge of the signal "d1". A monostable multivibrator 129 generates a signal "b1" in response to the page sync signal "a1". A monostable multivibrator 130 generates a signal "c1" in response to the output signal "b1" from the monostable multivibrator 129. A gate (no reference character) generates the signal "d1" on the basis of the signals "a1" and "c1". The page sync signal "a1" is set to correspond to the start position of each of the inkless regions $V_Y$, $V_M$, $V_C$, and $V_{BK}$. The signal delay time given by the monostable multivibrators 129 and 130 is chosen to match the width of each of the inkless regions $V_Y$, $V_M$, $V_C$, and $V_{BK}$.

As shown in FIG. 6, the generation of the higher 8 bits "e1" of the address signal 136 is started at the moment of the occurrence of the positive-going edge of the page sync signal "a1". This generation of the higher 8 bits "e1" of the address signal 136 continues for the given interval determined by the monostable multivibrator 129 and is terminated at the moment of the occurrence of the positive-going edge of the signal "b1". The given interval is chosen to reside within the period corresponding to the width of the inkless regions $V_Y$, $V_M$, $V_C$, and $V_{BK}$. The generation of the higher 8 bits "e1" of the address signal 136 is restarted at the moment of the occurrence of the positive-going edge of the signal "c1" which follows the moment of the occurrence of the positive-going edge of the signal "b1" by the interval determined by the monostable multivibrator 130. The second generation of the higher 8 bits "e1" of the address signal 136 is chosen to occur within the period corresponding to the width of the ink regions Y, M, C, and Bk. As will be made clear hereinafter, the first generation of the higher 8 bits "e1" of the address signal 136 is used to read out the head of the printing data of each color from the RAM 124 and to perform the blank printing with the readout head of the printing data. The second generation of the higher 8 bits "e1" of the address signal 136 is used to read out the whole of the printing data of each color from the RAM 124 and to perform the actual printing with the readout whole of the printing data.

The density data generator 126 counts timing pulses 137 fed from the main scan address generator 122. In the case where a strobe signal is repeatedly generated to perform multi-density-value (multi-halftone) printing for the same line, the pulse counting allows the density data generator 126 to detect which of the densities the energizing is currently performed for. The density data generator 126 outputs a density data signal 139 in agreement with the pulse counted number in the range of 0–255. The density data signal 139 is fed to the density selector 125 and the energizing time controller 128.

The density selector 125 receives a 1-line image information signal 135 from the RAM 124. The density selector 125 generates an on-selection signal 112 on the basis of the image information signal 135 and the density data signal 139. The on-selection signal 112 is fed to the thermal head 11. The on-selection signal 112 represents whether or not each heating element in the thermal head 11 should be on (energized).

Figure 7:
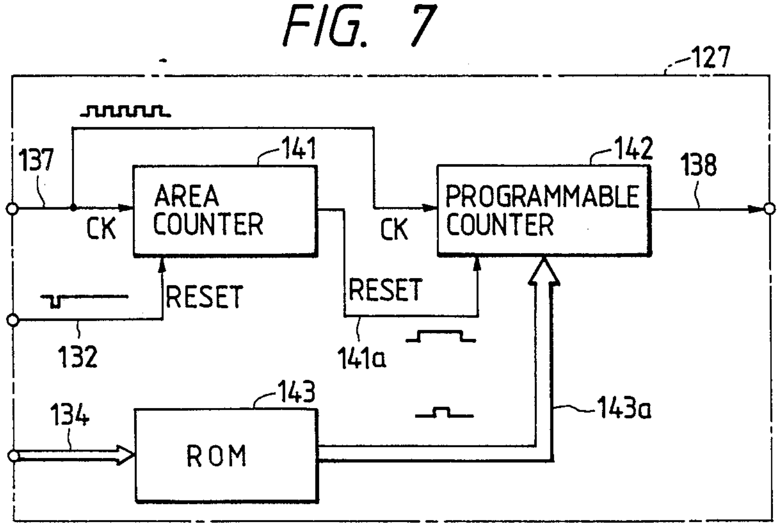
FIG. 7 is a block diagram of the starting density controller of FIG. 5.

As shown in FIG. 7, the starting density controller 127 includes an area counter 141, a programmable counter 142, and a ROM 143. The area counter 141 is reset by the line sync signal 132. The area counter 141 counts the timing pulses 137 fed from the main scan address generator 122 and outputs a pulse 141a which determines the longest initial energizing interval. The programmable counter 142 is reset by the pulse 141a from the area counter 141. The programmable counter 142 counts the timing pulses 137 and outputs a pulse 138 which determines the initial energizing interval. The ROM 143 generates a preset data 143a in response to the color selection signal 134. The preset data 143a is fed to the programmable counter 142.

Figure 8:
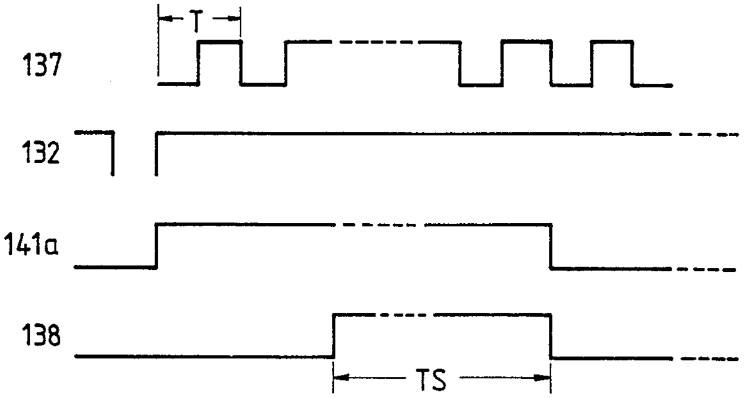
FIG. 8 is a timing diagram showing the various signals in the starting density controller of FIG. 7.

As shown in FIG. 8, the timing pulses 137 occur at a period T. The pulse 141a outputted from the area counter 141 starts in response to the line sync signal. The pulse 141a has a predetermined duration corresponding to a given counted number of the timing pulses 137. The pulse 138 outputted from the programmable counter 142 starts at a moment which follows the moment of the start of the pulse 141a by a time determined by the preset data 143a fed from the ROM 143. The pulse 138 terminates simultaneously with the termination of the pulse 141a.

The preset data 143a outputted from the ROM 143 determines the duration of the pulse 138, that is, an energizing time TS which depends on the color type. Specifically, the preset data 143a represents the difference in duration between the pulses 138 and 141a. The ROM 143 responds to the color selection signal 134 to vary the duration difference in accordance with the color type.

The starting density controller 127 starts the initial energizing interval at a moment dependent on the color type and terminates the initial energizing interval at a timing which allows simultaneous printing of the first of the densities.

Figure 9:
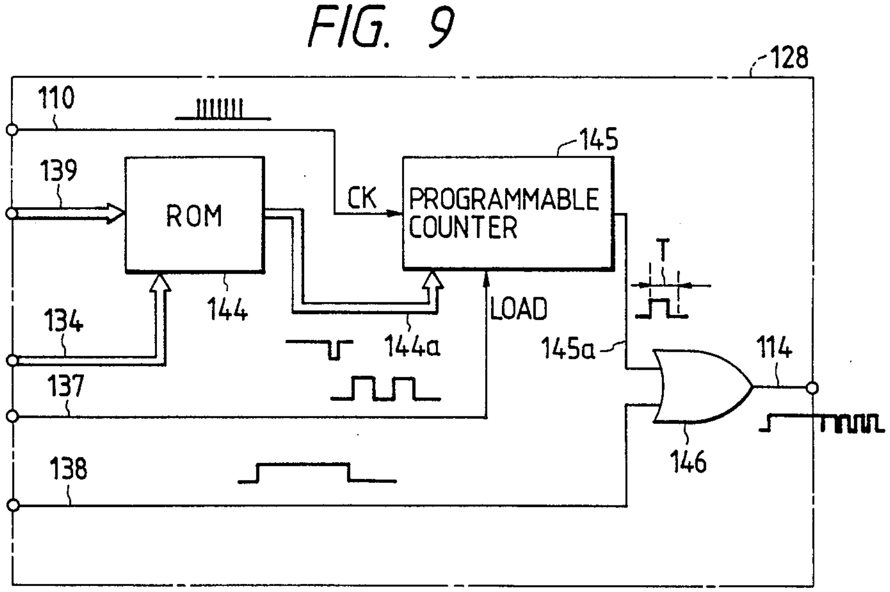
FIG. 9 is a block diagram of the energizing time controller of FIG. 5.

As shown in FIG. 9, the energizing controller 128 includes a ROM 144, a programmable counter 145 and an OR circuit 146. The ROM 144 generates a preset data 144a on the basis of the density data signal 139 and the color selection signal 134. The preset data 144a is fed to the programmable counter 145. The programmable counter 145 counts the reference clock pulses 110. The programmable counter 145 receives the timing pulses 137. The programmable counter 145 intermittently generates a pulse 145a at a period equal to the period T of the timing pulses 137. This pulse 145a determines a unit energizing interval.

In the case where the programmable counter 145 does not receive the preset data 144a from the ROM 144, the programmable counter 145 outputs the pulses 145a each having a duration equal to the period T of the timing pulses 137. These pulses 145a are fed to the thermal head 11 for the second of the densities within the unit energizing interval T. In the case where a given suspension time is required as in the other densities, the ROM 144 feeds the preset data 144a to the programmable counter 145. The frequency of the reference clock signal 110 is much higher than the frequency of the timing pulse signal 137, and the suspension time is set with an accuracy determined by the frequency of the reference clock signal 110.

The OR circuit 146 combines the pulses 145a from the programmable counter 145 and the pulses 138 from the starting density controller 127 into the strobe signal 114 fed to the thermal head 11. In the strobe signal 114, the initial energizing pulse 138 precedes the unit energizing pulses 145a. As a result, each heating element to be used for the printing is energized by the initial energizing pulse 138 for the first of the densities and is then energized by the unit energizing pulses 145a for the later densities.

Figure 10:
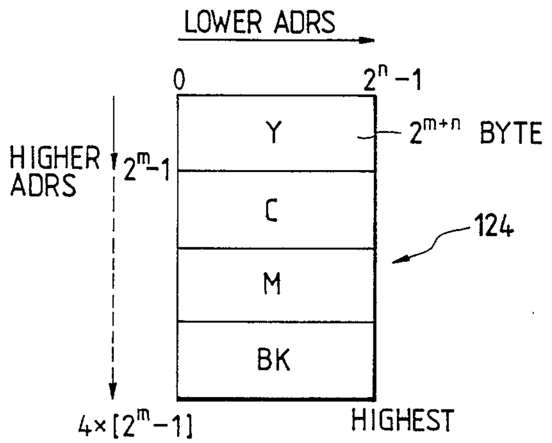
FIG. 10 is a diagram of the RAM of FIG. 5.

As shown in FIG. 10, the RAM 124 includes frame segments for storing yellow data "Y", cyan data "C", magenta data "M", and black data "BK" respectively. Each of these frame segments has a horizontal dimension corresponding to the lower address in the range of 0 to $2^n-1$ and a vertical dimension corresponding to the higher address in the range of 0 to $2^m-1$. Thus, each of the frame segments has a capacity of $2^{n+m}$ bytes. The lower address corresponds to the main scan direction, that is, the direction of the line of the heating elements in the thermal head 11. The higher address corresponds to the sub scan direction.

Figure 11:
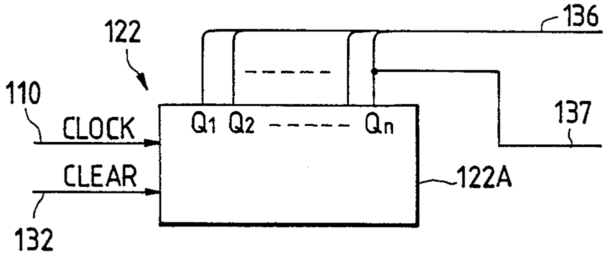
FIG. 11 is a diagram of the main scan address generator of FIG. 5.

As shown in FIG. 11, the main scan address generator 122 includes a counter 122A cleared by the line sync signal 132 and counting the reference clock pulses 110 to generate the lower bits of the address signal 136 which assume a value in the range of 0 to $2^n-1$. The highest of these lower bits of the address signals 136 constitutes the timing pulse signal 137.

Figure 12:
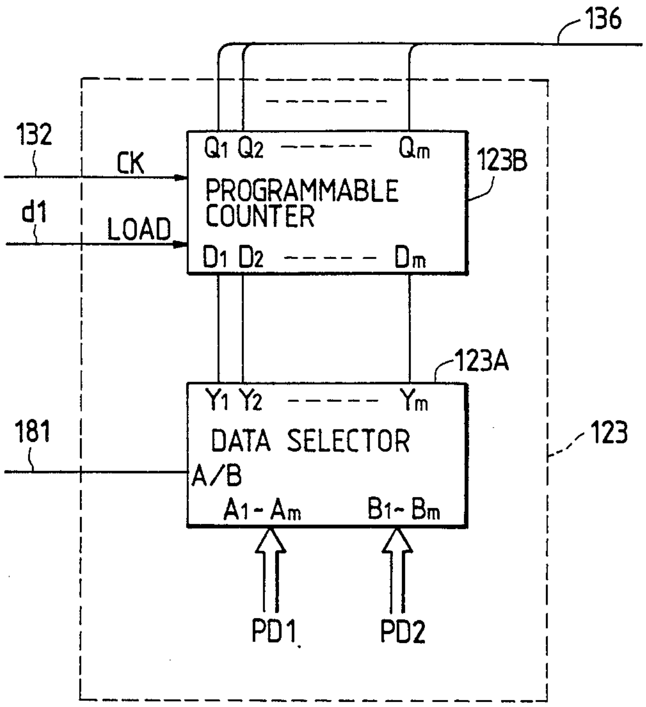
FIG. 12 is a block diagram of the sub scan address generator of FIG. 5.
Figure 13:
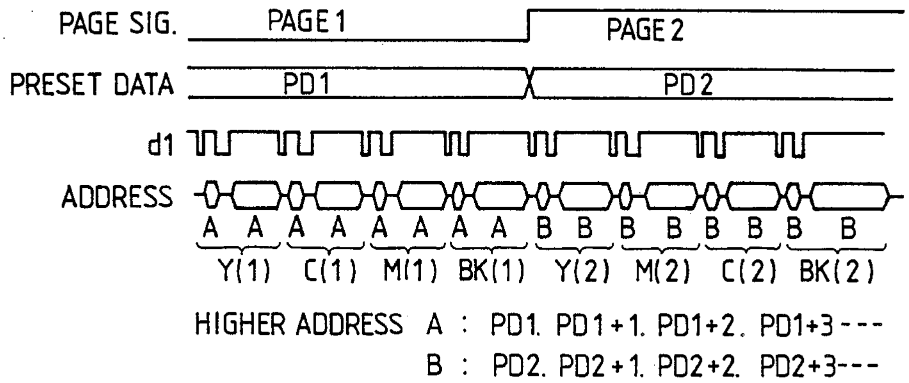
FIG. 13 is a timing diagram of the various signals in the sub scan address generator of FIG. 12.

FIG. 12 shows the internal structure of the sub scan address generator 123. FIG. 13 shows the waveforms of the signals in the scan address generator 123. As shown in FIG. 12, the sub scan address generator 123 includes a data selector 123A and a programmable counter 123B. The data selector 123A selects one of two data PD1 and PD2 in accordance with a page change signal 181 and passes the selected data to the programmable counter 123B as a preset data 182 (see FIG. 13). The data PD1 corresponds to the starting line of the image location. The PD2 corresponds to the page changing address which has a value greater than the value of the data PD1 but smaller than the value "$2^m-1$". The programmable counter 123B counts the line sync pulses 132 and uses the signal "d1" (see FIG. 5) as an LOAD input. The programmable counter 123B outputs the higher bits of the address signal 136.

Figure 14:
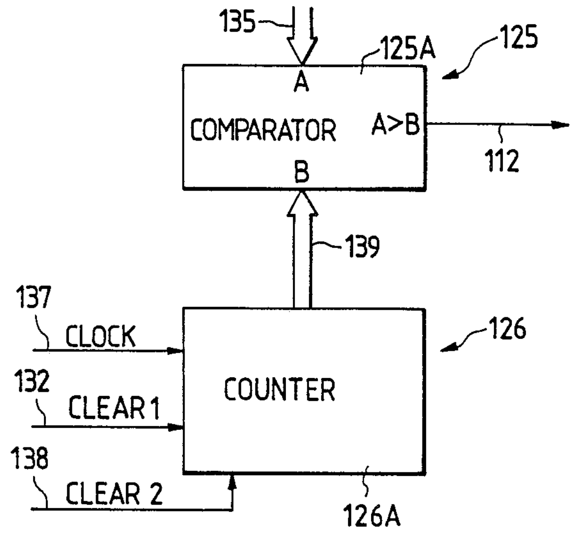
FIG. 14 is a block diagram of the density selector and the density data generator of FIG. 5.

As shown in FIG. 14, the density data generator 126 includes a counter 126A which counts the timing pulses 137 to generate the density data signal 139. The line sync signal 132 and the initial energizing pulse signal 138 are fed to the counter 126A as clear signals. During the application of the initial energizing pulse 138, the density data signal 139 remains "0". The termination of the initial energizing pulse 138 triggers the counter 126A and allows the counter 126A to start the counting of the timing pulses 137. The density selector 125 includes a comparator 125A receiving the density data signal 139 and the image information signal 135 which reiterates at the period of the timing pulse signal 137. The comparator 125A compares the values or levels represented by the signals 135 and 139, generating the on-selection signal 112.

DESCRIPTION OF THE SECOND PREFERRED EMBODIMENT

Figure 15:
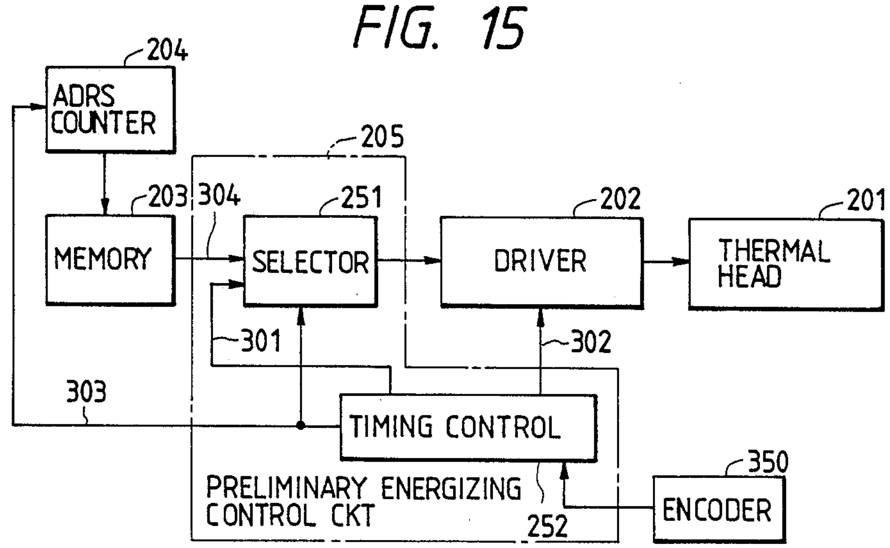
FIG. 15 is a block diagram of a thermal printer according to a second embodiment of this invention.

With reference to FIG. 15, a thermal printer includes a thermal head 201 having a linear array of heating elements formed on a substrate. A driver 202 controls the printing operation of the thermal head 201 by selectively feeding printing pulses to the heating elements. A memory 203 stores printing image data. An address counter 204 outputs a read address signal to the memory 203, controlling the reading of the image data from the memory 203 in accordance with the read address signal.

A preheating controller 205 is connected between the memory 203 and the driver 202. The preheating controller 205 includes a selector 251 and a timing controller 252. The selector 251 selects one of the image data 304 from the memory 203 and fixed data 301 from the timing controller 252 and passes the selected data to the driver 202. The timing controller 252 generates the fixed data 301 and control signals 302 and 303. The control signal 302 is applied to the driver 202. The control signal 303 is applied to the selector 251 and the address counter 204. The address counter 204 counts pulses in the control signal 303 to generate the read address signal.

Figure 16:
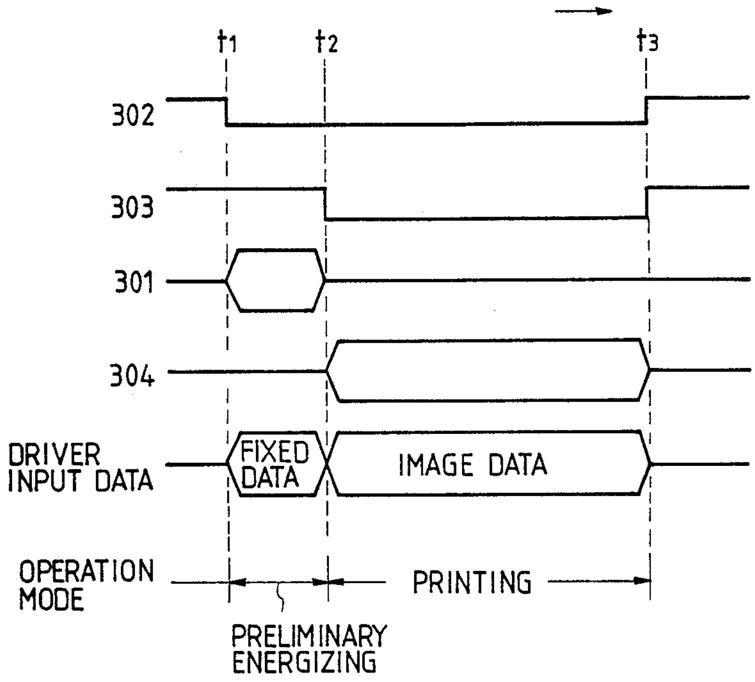
FIG. 16 is a timing diagram showing the various signals in the thermal printer of FIG. 15.

As shown in FIG. 16, the control signal 302 changes from a high level to a low level at a moment t1 and then returns from the low level to the high level at a moment t3. The control signal 303 changes from a high level to a low level at a moment t2 between the moments t1 and t3 and then returns from the low level to the high level at the moment t3. While the control signal 302 is in the low level, the thermal head 201 remains activated. While the control signal 303 is in the low level, the address counter 204 continues to output the read address signal to the memory 203 so that the image data remains sequentially read out from the memory 203.

As shown in FIG. 16, during the interval between the moments t1 and t2, the heating elements of the thermal head 201 are subjected to preliminary energizing which heats the substrate of the thermal head 201 to a predetermined temperature. During the interval between the moments t2 and t3, the thermal head 201 performs intended printing operation in accordance with the image data read out from the memory 203.

During the preliminary energizing, that is, during the interval between the moments t1 and t2, the timing controller 252 outputs the fixed data 301. The fixed data 301 is chosen to heat the thermal head 201 to a temperature immediately below an active temperature range where a thermal paper can be colored or ink can be transferred from a transfer paper.

While the control signal 303 is in the high level, the selector 251 selects the fixed data 301 and passes the fixed data 301 to the driver 202. When the control signal 303 changes from the high level to the low level, the selector 251 selects the image data 304 and passes the image data 304 to the driver 202.

The preliminary energizing of the thermal head 201 is performed before the printing operation. Specifically, the timing controller 252 changes the control circuit 302 from the high level to the low level at the moment t1. The timing controller 252 outputs the fixed data 301 to the selector 251. At this time, the control signal 303 is in the high level, so that the address counter 204 suspends and the selector 251 passes the fixed data 301 to the driver 205. Therefore, the preliminary energizing of the thermal head 201 is started. As a result of the preliminary energizing, the temperature of the substrate of the thermal head 201 is heated to the predetermined temperature.

At the subsequent moment t2, the control signal 303 changes from the high level to the low level so that the address counter 204 starts to feed the read address signal to the memory 203. The image data 304 is read out from the memory 203 in response to the read address signal. The readout image data 304 is applied to the selector 251. At this time, since the control signal 303 is in the low level, the selector 251 selects the image data 304 and passes the image data 304 to the driver 202. As a result, the driver 202 activates the thermal head 201, performing the printing operation responsive to the image data 304. In this way, as shown in FIG. 16, the driver 202 receives the fixed data 301 for the preliminary energizing at first and then receives the printing image data 304. The preliminary energizing of the thermal head 201 enables the temperature of the thermal head 201 to be within a desirable range even at the start of the subsequent normal printing, so that the printing density can be held at the required level even at the start of the printing.

An encoder 350 connected to a platen motor shaft (not shown) outputs a paper position-representing pulse signal to the timing controller 252. The timing controller 252 includes a suitable frequency divider which frequency-divides the encoder output signal to derive a line pulse signal. The timing controller 252 also includes a CPU. The CPU counts the line pulses to generate various pulse signals necessary for the sub scan. The CPU starts the counting of the line pulses in response to a pulse from the encoder 350 which is generated for every revolution of the platen motor shaft. When the pulse counted number reaches a reference number corresponding to the moment t1, the CPU changes the control signal 302 from the high level to the low level. When the pulse counted number reaches a reference number corresponding to the moment t2, the CPU changes the control signal 303 from the high level to the low level. When the pulse counted number reaches a reference number corresponding to the moment t3, the CPU returns the control signals 302 and 303 from the low level to the high level.

DESCRIPTION OF THE THIRD PREFERRED EMBODIMENT

Figure 17:
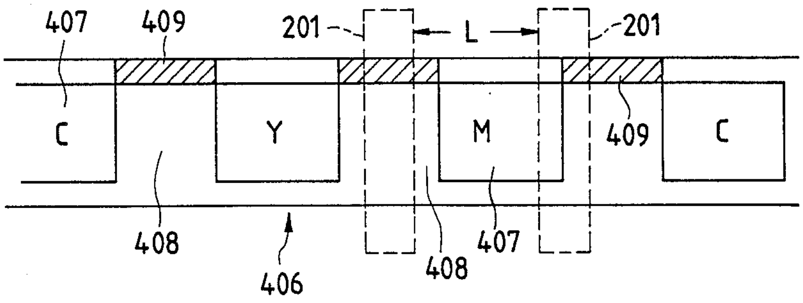
FIG. 17 is a diagram of an ink transfer film and a thermal head in a third embodiment of this invention.

FIG. 17 relates to a third embodiment of this invention which is similar to the embodiment of FIGS. 15 and 16 except for the following points.

As shown in FIG. 17, a thermal transfer film (or paper) 406 has regularly spaced regions 407 to which yellow "Y" ink, magenta "M" ink, and cyan "C" ink are sequentially provided. Inkless regions 408 having a predetermined width are provided between the ink regions 407. Reflective or opaque reference marks 409 extend abreast of the respective inkless regions 408.

At first, the preliminary energizing is performed while the thermal head 201 remains opposed to one of the inkless regions 408. During the preliminary energizing, the printing will not be performed since the thermal head 201 is opposed to the inkless region 408. Accordingly, during the preliminary energizing, the heating elements of the thermal head 201 can be heated to high temperatures. The high-temperature heating of the thermal head 201 enables the duration of the preliminary energizing to be short. When the preliminary energizing is completed, the thermal head 201 is moved relative to the thermal transfer film 406 so that the thermal head 201 reaches the adjacent ink region 407. Then, the normal printing is performed while the thermal head 201 is relatively moved across the ink region 407.

The encoder 350 (see FIG. 15) is replaced by an optical position sensor (not shown) which detects the position of the thermal transfer film 406 relative to the thermal head 201. When the optical position sensor detects the front edge of each reference mark 409, the control signal 302 is changed from the high level to the low level to start the preliminary energizing of the thermal head 201. When the optical position sensor detects the rear edge of the reference mark 409, the control signal 303 is changed from the high level to the low level to terminate the preliminary energizing of the thermal head 201.

What is claimed is:

1. A thermal printer comprising:

a thermal head;

means for transporting an ink film having inkless regions and a printing paper so as to be scanned by said thermal head;

means for outputting printing data;

means for copying a portion of the printing data;

means for adding the copied portion to a head of the printing data to form a combination of the copied portion and the printing data; and means for outputting the data combination to the thermal head, driving the thermal head with the copied portion to preheat the thermal head when said inkless regions are under the thermal head, and then driving the thermal head with the printing data to perform actual printing on the printing paper using the ink film.

2. The thermal printer of claim 1 wherein the copied portion of the printing data corresponds to a head portion of the printing data.

3. A thermal printer comprising:

a thermal head;

means for transporting an ink film having inkless regions and a printing paper so as to be scanned by said thermal head;

means for outputting printing data;

a memory;

means for storing the printing data into the memory;

means for reading out a portion of the printing data from the memory;

means for reading out a whole of the printing data from the memory;

means for adding the readout portion of the printing data to a head of the readout whole of the printing data to form a combination of the readout portion and the readout whole of the printing data; and means for outputting the data combination to the thermal head, driving the thermal head with the readout portion of the printing data to preheat the thermal head when said inkless regions are under the thermal head, and then driving the thermal head with the readout whole of the printing data to perform actual printing on the printing paper using the ink film.

4. The thermal printer of claim 3 wherein the readout portion of the printing data corresponds to a head portion of the printing data.

5. A thermal printer comprising:

a thermal transfer paper having spaced ink regions, inkless regions between the ink regions, and reference regions corresponding to the respective inkless regions;

a thermal head;

means for transporting the thermal transfer paper relative to the thermal head and allowing the thermal transfer paper to be scanned by the thermal head;

means for sensing the reference regions to detect whether the thermal head scans the ink regions or the inkless regions;

means for preheating the thermal head when the sensing means detects that the thermal head scans the inkless regions.

6. The thermal printer of claim 5 wherein the preheating means comprises means for feeding predetermined data to the thermal head when the sensing means detects that the thermal head scans the inkless regions.

* * * * *